(12) United States Patent
Gomez

(10) Patent No.: US 6,988,278 B2
(45) Date of Patent: Jan. 17, 2006

(54) PROCESS AND SYSTEM FOR VIDEO ON DEMAND

(75) Inventor: Etienne Gomez, Toulouse (FR)

(73) Assignee: Astrium SAS, Velizy-Villacoublay (FR)

(*) Notice: Subject to any disclaimer, the term of this patent is extended or adjusted under 35 U.S.C. 154(b) by 1009 days.

(21) Appl. No.: 09/880,101

(22) Filed: Jun. 14, 2001

(65) Prior Publication Data

US 2002/0087994 A1 Jul. 4, 2002

(30) Foreign Application Priority Data

Jun. 14, 2000 (EP) ................................ 00401679

(51) Int. Cl.
*H04N 7/173* (2006.01)

(52) U.S. Cl. ...................... 725/101; 725/102; 725/103

(58) Field of Classification Search ........ 725/101–103, 725/87, 93, 100

See application file for complete search history.

(56) References Cited

U.S. PATENT DOCUMENTS

| | | | | |
|---|---|---|---|---|
| 5,701,582 | A * | 12/1997 | DeBey | 725/103 |
| 5,724,646 | A * | 3/1998 | Ganek et al. | 725/89 |
| 5,768,379 | A | 6/1998 | Girault et al. | |
| 5,793,412 | A | 8/1998 | Asamizuya | |
| 5,884,141 | A | 3/1999 | Inoue et al. | |
| 5,917,538 | A * | 6/1999 | Asamizuya | 725/94 |
| 6,018,359 | A * | 1/2000 | Kermode et al. | 725/101 |
| 6,144,400 | A * | 11/2000 | Ebisawa | 725/101 |
| 6,314,576 | B1 * | 11/2001 | Asamizuya et al. | 725/91 |
| 6,487,722 | B1 * | 11/2002 | Okura et al. | 725/40 |
| 6,502,139 | B1 * | 12/2002 | Birk et al. | 709/233 |
| 6,647,411 | B2 * | 11/2003 | Towell et al. | 709/213 |
| 6,701,528 | B1 * | 3/2004 | Arsenault et al. | 725/89 |

FOREIGN PATENT DOCUMENTS

| | | |
|---|---|---|
| EP | 0 633 694 A1 | 1/1995 |
| EP | 09219852 | 8/1997 |
| WO | WO 92/11713 | 7/1992 |
| WO | WO 96/13125 | 5/1996 |
| WO | WO 99/35617 | 9/1999 |

* cited by examiner

*Primary Examiner*—Chris Kelley
*Assistant Examiner*—Farzana E. Hossain
(74) *Attorney, Agent, or Firm*—Stites & Harbison PLLC; Ross F. Hunt, Jr.

(57) ABSTRACT

For providing video-on-demand (VOD) a set comprising a plurality of N video programs at staggered time intervals is repeatedly transmitting from a VOD server to a network for access by a view box of an user; responsive to a request for access to a selected program by the user, there is selection of that in-progress transmission of the selected program for which a lead-in portion is shortest and storage of the program in a buffer associated with the view box as it is transmitted. A previously stored beginning portion of the selected program having a time length sufficient to compensate for that time interval is selected, in a memory associated with the view box, and outputting to the view box for display. The in-progress transmission stored in the buffer is continuously spliced to a conclusion of the beginning portion. All different video programs in a same set are transmitted with mutual time shifts equal to a fraction of the staggered interval.

6 Claims, 3 Drawing Sheets

PROCESS AND SYSTEM FOR VIDEO ON DEMAND

FIELD OF THE INVENTION

The invention relates to Video-On-Demand (VOD) provided by a server to users provided with a view box via a telecommunication network or a satellite link, possibly through the Internet.

BACKGROUND OF THE INVENTION

Serving various programs by broadcasting them repeatedly, each new broadcast beginning when the preceding has ended does not satisfy users. On the other hand serving the selected video program on a separate channel to each user upon request is expensive and inefficient.

For satisfying a user's request for a video program without too much delay, an approach known as Near-Video-On-Demand (N-VOD) has been developed, wherein each video program is repeatedly made available at a fixed staggered time interval, thereby reducing the maximum delay to the staggered time interval, which is typically several minutes.

An improvement strongly reducing the maximum time delay between the user's request and the availability of the video program is known as Hybrid-Video-On-Demand (HVOD). A description of that approach is given in U.S. Pat. No. 5,682,597 to which reference may be made. According to that approach, multiple copies of each program are continuously sent on separate channels and again the start of each copy is offset by a staggered time interval. At the user's end, VOD requests which are not synchronous with the beginning of a transmission are initially fulfilled with the start of a specific additional transmission of the beginning portion of the selected video program for that user, while simultaneously maintaining use of the NVOD transmission for that requestor. The in-progress transmission of the selected video program is stored in a buffer associated with the viewbox and spliced to a conclusion of the beginning portion of the video program for output by the viewbox and display.

That approach requires specific transmission of the beginning portion of the selected video program on request by only one user and still increases the amount of network resources which are required. Network resources can be saved by providing a large size buffer in the viewbox and storing the beginning portion of each of the video programs once for each period during which the programs remain unchanged (once a week for instance). Then there is no need to transmit the beginning portion of a selected program to the respective user. The volume of data to be transmitted is reduced and downloading of the beginning portions may take place when the network load is low. A user's request for an in-progress program is initially and immediately fulfilled by reading the beginning portion from the buffer while the remaining portion is stored for later read-out after splicing. A buffer allowing simultaneous read-out and writing is necessary, since storage proceeds after splicing.

A limiting factor in the implementation of that approach is the buffer size. Typically transmissions of all video or multimedia programs on the network start at the same time For any selected program to be immediately available to a user even in the worst conditions, when the request takes place just before a new transmission of the N programs takes place, the buffer capacity required for storing the beginning portions is little less than N times the staggered time interval. A shorter staggered time interval and conversely a greater number of simultaneous time offset transmissions of a same program require a lesser buffer size but increasingly draw on network resources.

SUMMARY OF THE INVENTION

It is an object of the invention to provide an enhanced VOD system and process using a buffer for storing beginning portions of the available programs which spares network or satellite link resources for a given buffer size.

For that purpose, there is provided a method of providing video-on-demand (VOD) comprising the steps of:

repeatedly transmitting a set comprising a plurality of N video programs at staggered time intervals from a VOD server to a network for access by a view box of an user, and responsive to a request for access to a selected one of said programs by said user, selecting that in-progress transmission of the selected program for which a lead-in portion is shortest and storing said program in a buffer associated with the view box as it is transmitted, selecting, in a memory associated with the view box, a previously stored beginning portion of said selected program having a time length corresponding to that of said staggered time intervals and outputting said beginning portion to said view box for display, and continuously splicing the in-progress transmission stored in the buffer to a conclusion of the beginning portion, wherein all different video programs in a same set are transmitted with time shifts equal to a fraction of the staggered time interval.

An optimal value for all time shifts is a fraction 1/N of the staggered time interval (time period between two transmissions of a same video program) and provides the greater resource saving for a given buffer size and a given number of programs.

Preferably downloading the beginning portion of each specific program into all view boxes connected to the server takes place during the last period of low network load prior to availability of said program from the server and involves erasing the preceding portions.

There is also provided a video on demand system enabling to carry out the above defined process having;

at a head end of the network, a server for repeatedly transmitting a set comprising a plurality of N video programs at staggered time intervals (δ) to a network for access by a view box of an user, and at each of user's ends, view box unit having a bidirectional connection with said server, each said view box unit comprising:

a buffer for simultaneous writing in of a program transmitted on the network by said server and read out of said program with a time difference between writing in and read out of a same portion, memory means for storing beginning portions of predetermined duration of a plurality of programs adapted to be received and displayed by said view box unit, user operated means for selectively tuning said view box unit for reception of a program repeatedly originating from said server as successive transmissions at time intervals on different channels, and storing that transmission of said program which began most recently as it proceeds, means for reading out the beginning portion of the program which has been selected from the memory means, and switching means for splicing the selected beginning portion with the following portion of the same program for display when said following portion becomes available from the buffer, wherein said server is arranged for transmitting all different video programs in a same set with time shifts equal to a fraction of the staggered interval.

BRIEF DESCRIPTION OF THE DRAWINGS

The above and additional features will appear from the following description of particular embodiments of the invention, given by way of examples only. The description refers to the accompanying drawings, wherein.

DESCRIPTION OF THE PREFERRED EMBODIMENTS

Figure 1:
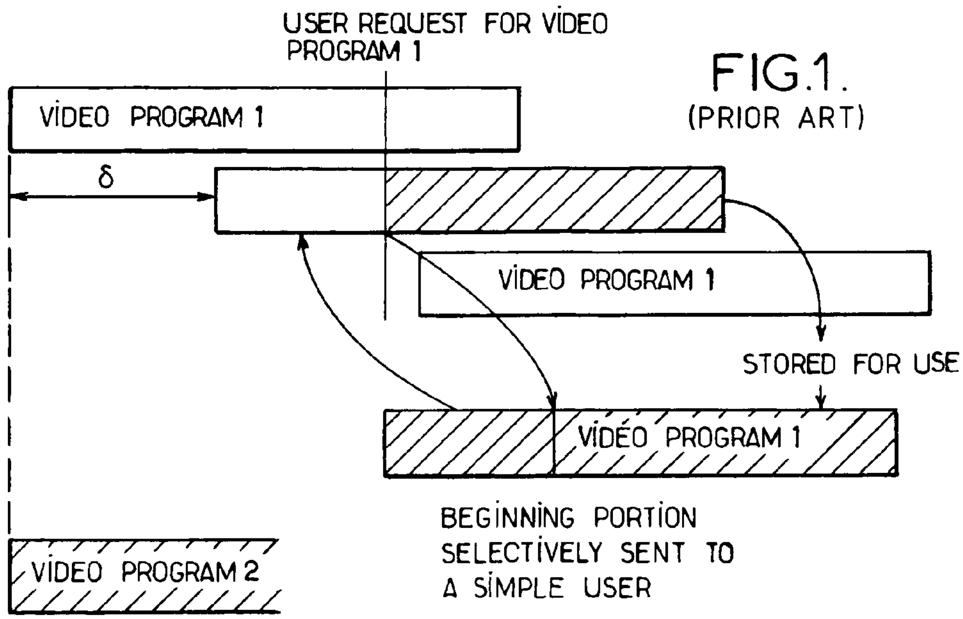
FIG. 1 is a timing diagram for illustrating the main feature of Hybrid Video On Demand.

For purpose of comparison FIG. 1 indicates the time relationship between successive transmissions of two video programs 1 and 2 by a server in a HVOD system Successive transmissions of program 1 take place at times separated by intervals δ. A request R by an user, at a time t asynchronous with the beginning of a transmission. The request is initially and immediately fulfilled by a specific transmission of the beginning portion to that single user for immediate display without storage. During that specific transmission, the user's terminal also processes the in-progress transmission and stores it in a buffer of the viewbox. At the end of the beginning portion (earlier than the stored portion), as indicated for example by a flag stored at the server, the specific transmission is stopped and read out of the buffer is initiated. The stored portion is spliced to the end of the beginning portion and at the same time the portion of the program not yet transmitted is stored in the buffer.

Figure 2:
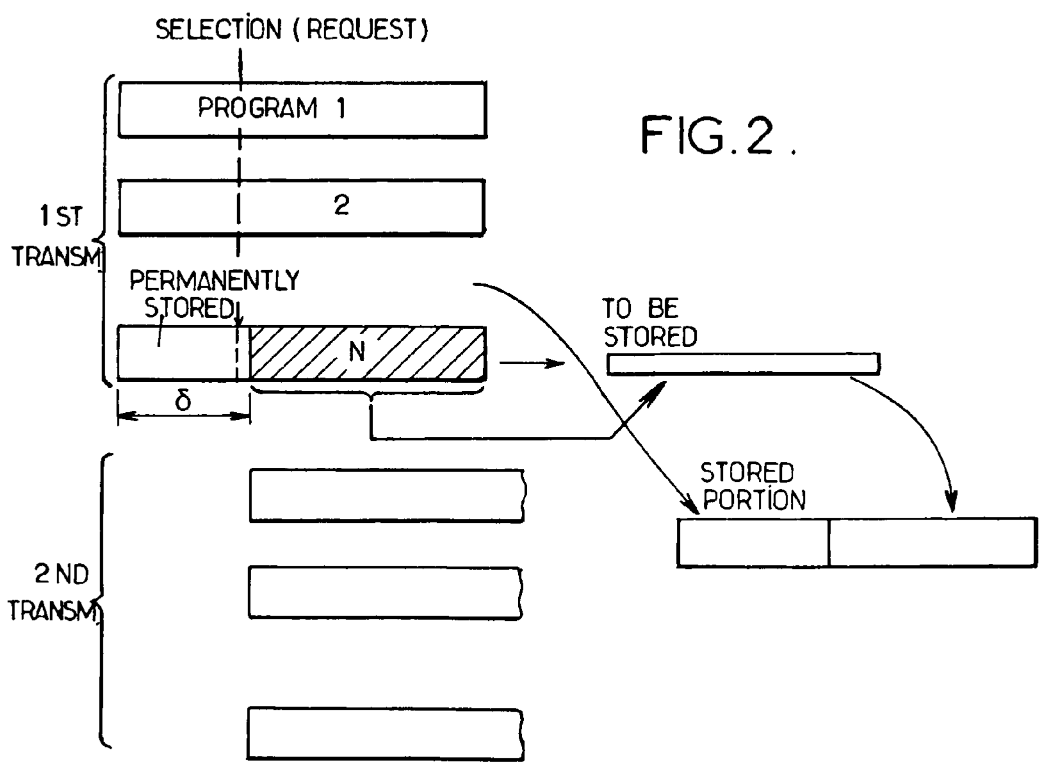
FIG. 2 is a timing diagram illustrating the requirements for a system with storage in a buffer; when all transmissions begin at the same time.

Referring now to FIG. 2, an improved version reducing the need for transmission resources requires a buffer having an increased capacity for continuously storing the beginning portions of all video programs. Typically, all N video programs are initiated at the same instant. If there is a requirement that the user be able to start watching any program, including when zapping from a program he or she was watching, the buffer has to store data transmitted for N times the staggered time duration, at least if immediate availability is required even in the worst case (request just before a new transmission of the selected program begins, as indicated on FIG. 2). Then the buffer size (storable number of Mbytes) C is:

$$C = N.\delta.\beta$$

where

N is the number of different video programs,

δ is the staggered time intervals between two successive transmissions of a same program, β is the bit rate for one program.

That means that there is a relation between the maximum buffer capacity Co assigned to storage of the beginning portions, the staggered time intervals and the number of simultaneous transmissions which are required , conditioned by the number of different video programs and the staggered time interval. For a given capacity Co and a required number N of programs, there should a sufficient number of simultaneous transmission for the staggered time interval δ to be lower than Co/(N.β)

The requirements as to the buffer size and/or the required resources are significantly reduced by offsetting the starts of transmissions of a same set of programs by a fraction of the time interval. In a preferred arrangement, illustrated on FIG. 3, the starts of the N programs are evenly distributed inside a period equal to the staggered time interval, i.e. at intervals $\mu=\delta/N$. The transmitted portion of each program which is stored in the buffer is as indicated in crossed lines. It could as well be a same sequence of evenly decreasing storage periods starting from another program.

In a first embodiment, which permits starting viewing any video program immediately upon request, except from a situation where another program is being watched, a saving ratio close to [(N−1)/2N] on the network or satellite link resource may be achieved for a same buffer size, as compared with a situation where transmissions of all programs of a same set start simultaneously. . When there is a high number of different transmitted program in the set, the resource saving may approach 50% in that case.

Figure 3:
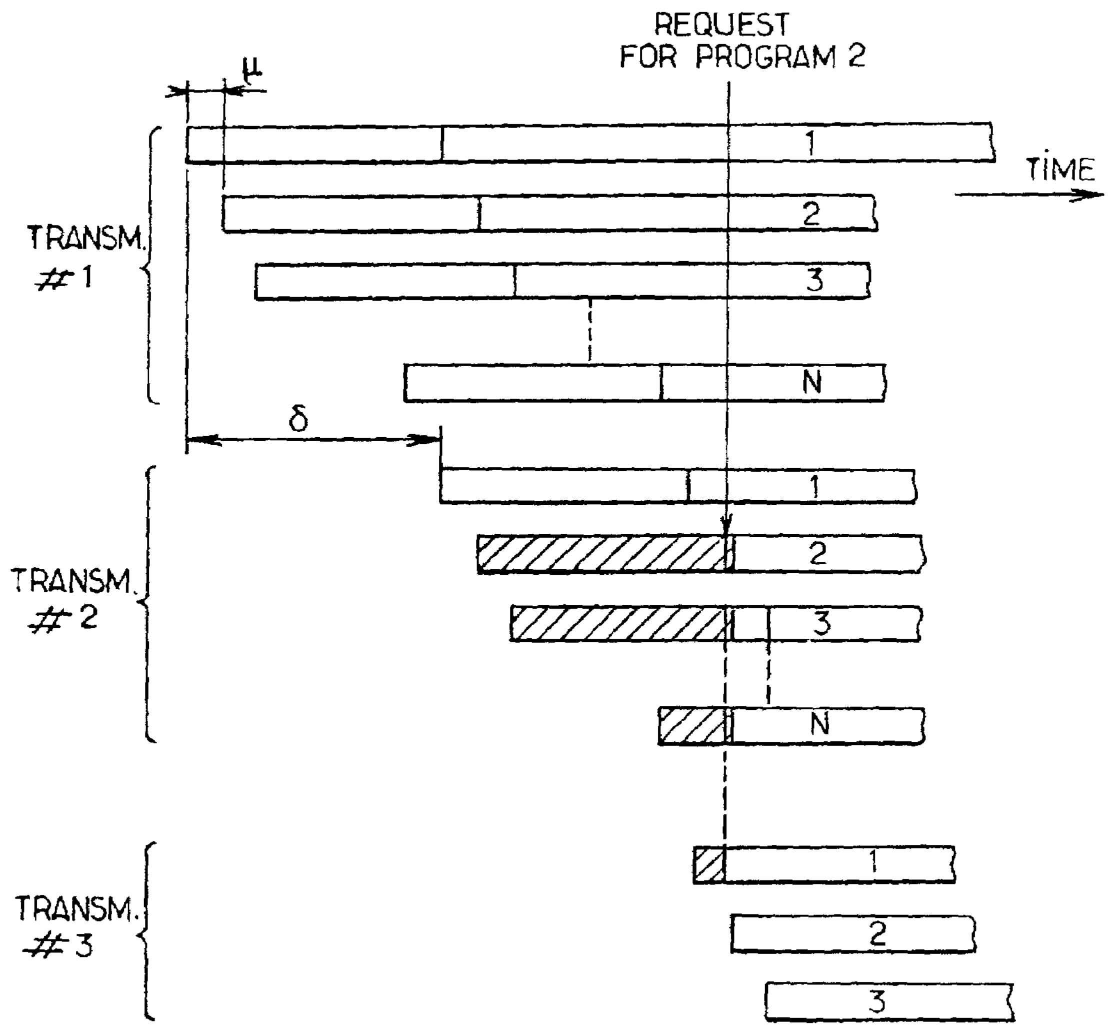
FIG. 3 is a time diagram illustrating a particular embodiment.

Referring to FIG. 3 two successive transmissions of a set of N=7 programs and part of a third transmission are illustrated. Transmissions of the programs begin at intervals of δ/N. Assuming that the maximum buffer size available for program storage is Co, corresponding to a time duration To, then the minimum staggered time δm acceptable between two transmissions of the same program is δm=To/N.

When it is necessary or preferable to transmit the whole program for simultaneous access by any user in the arrangement of FIG. 2 and each program has the same duration D, then the number of simultaneously transmitting channels Sallvp required for all programs is:

$$\begin{aligned} Sallvp &= D/\delta m \cdot N \\ &= D/To \cdot N^2 \end{aligned} \tag{1}$$

If on the other hand use is made of the approach illustrated in FIG. 3, the worst case again occurs when there is a request for a video program just before the beginning of a transmission of that program, as indicated at time t2 when program 2 is selected. Then the transmitted portion which does not need to be permanently stored in the buffer corresponds to the blank spaces. The time periods which must be stored are then as follows:

Video program 1: $\mu$

Video program 2: $N\mu=\delta m$

Video program 3: $2\mu$

Video program N: $(N-1)\mu$

The total duration to be stored is then:

$$To=\mu+2\mu+3\mu+4\mu+ \ldots +(N-1).\mu+N\mu=N.(N+1).\mu/2,$$

whatever the program which is selected.

Such a storing method permits to start watching any of the video program at any time but does not allow to start watching any other program than the selected one once watching has started.

As a consequence, $\delta m=2To/(N+1)$ $$\text{The number } S_{allvp} = ND/\delta m$$
$$= D/To \cdot N \cdot (N+1)2$$

A comparison with (1) shows that the number of simultaneous transmitting channels for all the video programs for a given storage capacity has been reduced by a factor (N+1)/2N compared to the baseline case.

The reduction is in the ratio (N−1)/2N)

Another embodiment (FIG. 4) offers the possibility to start watching any of the N video program at any time, including during the time a given program was watched; in that case the communications network or satellite link is optimized for saving a percentage of $(N^2-3N+2)/(2N^2))$ of the network resource with respect to the case where no time shift is applied between the transmission starting times of the different video programs. In that case additional storing duration δ for the watched program during watching of the program has to be provided.

The worst case is when a selected video program is requested at the end of the beginning portion. Then the contiguous slicing process implies to allocate the storing duration δ for the program during the whole watching. The worst case is selection $\mu$ seconds after the first program was selected.

Figure 4:
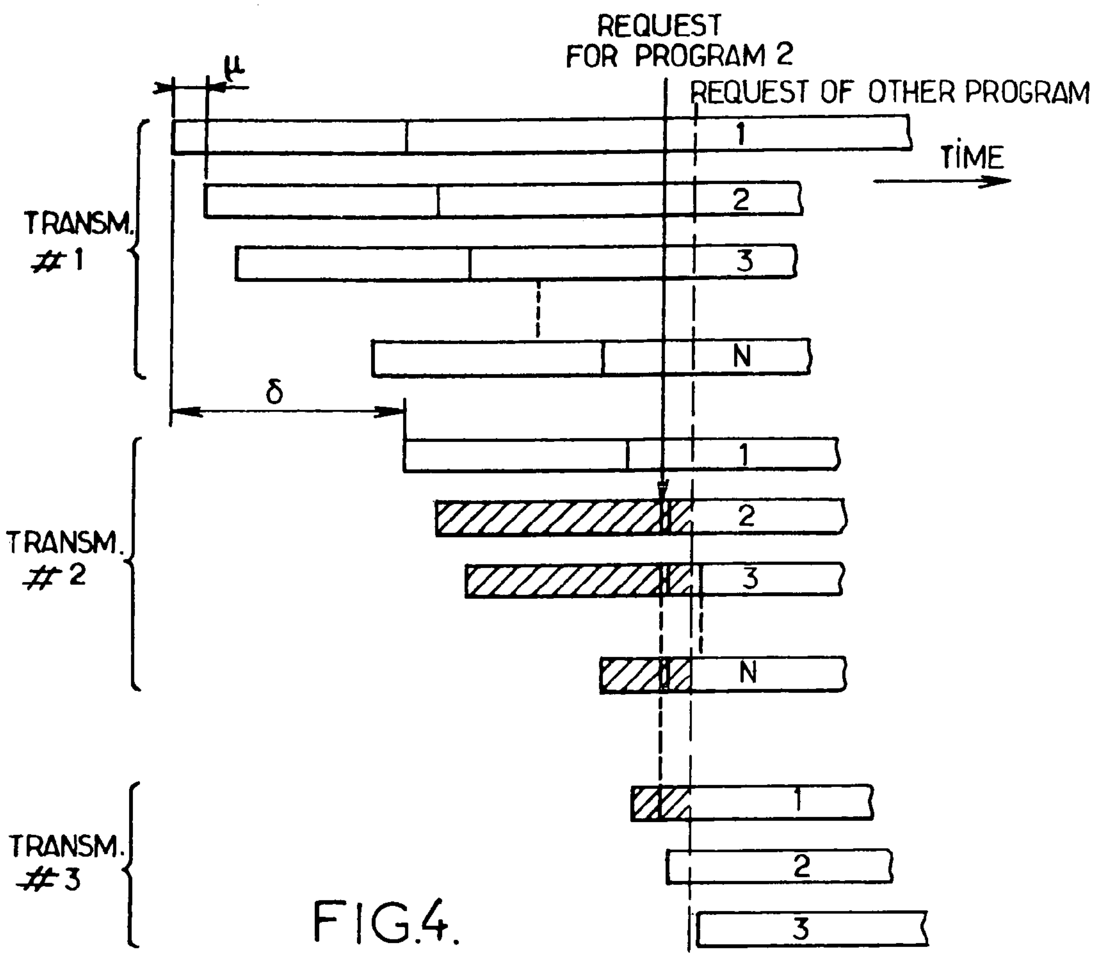
FIG. 4 is a time diagram illustrating another embodiment.

As illustrated on FIG. 4 just before the beginning portion of video program 3 stops (worst case), the periods for which transmission has to be stored are:

Video program 1: $2\mu$

Video program 2: $\mu$

Video program 3: $N\mu$

Video program 4: $(N-1)\mu$

. . .

Video program N: $3\mu$

Thus the total "duration" that has to be stored on the user buffer device is:

$$To=2\mu+3\mu+ \ldots +(N-1)/N\mu=N\mu+\delta=(\mu=2\mu+3\mu+ \ldots +N\mu)+N\mu-\mu-N(N+1^{\circ}\mu/2+N\mu-\mu$$

$$To=\mu(N(N+1)/2+N-1)$$

Again the sum is constant whatever the program previously watched and the newly selected program watching any of the video program may be started at any time and watching another program than the firstly selected one is possible once watching has started.

When fulfilling the necessary conditions:

$$To=(N(N+1)/2+N-1).\delta m/N$$

Hence:

$$\delta m=To/(N+1)/2+1-1/N)$$

$$S_{allvp} = ND/\delta m$$
$$= D/to \cdot [N(N+1)/2+N-1]$$

The number of simultaneous transmitting channels for all the video programs has been reduced by a factor $(N(N+1)/2+N-1/N^2$ as compared with formula (1) to the baseline case. This corresponds to a reduction ratio of:

$$(1-(N(N+1)/2+N-1)/N^2)=((N^2-3N+2)/(2N^2))$$

Figure 5:
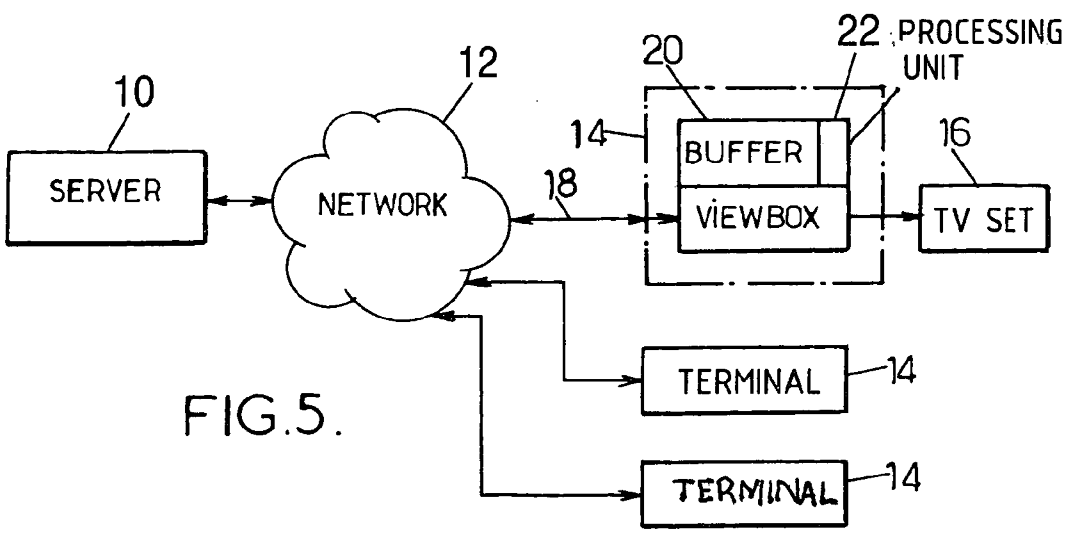
FIG. 5 is a simplified block diagram of a server—user system according to the invention.

The system schematically illustrated in FIG. 5 includes a server 10 connected to an interactive network 12 allowing transfer of data to and from user's terminals 14 via a plurality of channels. Each terminal 14 may be conventional in nature and be a decoder of available type, typically having a view box in compliance with commercial standards as DVD, MPEG 2, MPEG 4, VIDEO CD, MACROVISION. The terminal is connected to or embodied in one or more TV sets 16 and is connected to the network by a bi-directional transmission line 18. It further includes a buffer 20 of sufficient size for fulfilling the above requirements and various conventional components, including a processing unit 22 in which software for determining the end of the beginning period and splicing the video program portions is stored. Such processing unit controls the various steps which have been defined hereinabove.

What is claimed is:

1. A method of providing video-on-demand (VOD) comprising the steps of comprising the steps of:

repeatedly transmitting a set comprising a plurality of N video programs at staggered time intervals from a VOD server to a network for access by a view box of an user, and responsive to a request for access to a selected one of said programs by said user, selecting that in-progress transmission of the selected program for which a lead-in portion is shortest and storing said program in a buffer associated with the view box as it is transmitted, selecting, in a memory associated with the view box, a previously stored beginning portion of said selected program having a time length sufficient to compensate for that of said staggered time intervals and outputting said beginning portion to said view box for display, and continuously splicing the in-progress transmission stored in the buffer to a conclusion of the beginning portion, wherein all different video programs in a same set are transmitted with time shifts equal to a fraction of the staggered time interval.

2. A method according to claim 1, wherein all time shifts between two successive transmission are a same fraction 1/N of the staggered time interval.

3. A method according to claim 2, further comprising the step of downloading said beginning portion of a specific said program into all view boxes connected to said server during a last period of low network load prior to availability of said program from the server.

4. A method according to claim 1, further comprising the step of downloading said beginning portion of a specific said program into all view boxes connected to said server during a last period of low network load prior to availability of said program from the server.

5. A video on demand system having:

at a head end of the network, a server for repeatedly transmitting a set comprising a plurality of N video programs at staggered time intervals (δ) to a network for access by a view box of an user, and at user's ends, a plurality of view box units each having a bidirectional connection with said server, each said view box unit comprising:

a buffer for simultaneous writing in of a program transmitted on the network by said server and read out of said program with a time difference between writing in and read out of a same portion, memory means for storing beginning portions of predetermined duration of a plurality of programs adapted to be received and displayed by said view box unit, user operated means for selectively tuning said view box unit for reception of a program repeatedly originating from said server as successive transmissions at time intervals on different channels, and storing that transmission of said program which began most recently as it proceeds, means for reading out the beginning portion of the program which has been selected from the memory means, and switching means for splicing the selected beginning portion with the following portion of the same program for display when said following portion becomes available from the buffer, wherein said server is arranged for transmitting all different video programs in a same set with time shifts equal to a fraction of the staggered time interval.

6. A system according to claim 5, wherein said buffer is part of said memory means.

* * * * *